United States Patent [19]

Paul

[11] 4,088,038
[45] May 9, 1978

[54] DEVICE FOR CONNECTING EITHER ONE OF TWO ALTERNATIVE OPERATING MEMBERS WITH AN OPERATED MEMBER

[75] Inventor: Cornelis Paul, Dordrecht, Netherlands

[73] Assignee: AB Volvo Penta, Gothenborg, Sweden

[21] Appl. No.: 748,324

[22] Filed: Dec. 7, 1976

[51] Int. Cl.² .......................................... G05G 11/00
[52] U.S. Cl. ................................................. 74/479
[58] Field of Search ............... 74/479, 481, 482, 483 R

[56] References Cited

U.S. PATENT DOCUMENTS

| | | | |
|---|---|---|---|
| 2,702,615 | 2/1955 | Morse ............................ | 74/479 X |
| 3,128,738 | 4/1964 | Farrington et al. ............. | 74/479 |
| 3,651,709 | 3/1972 | Booty et al. .................... | 74/483 R |

*Primary Examiner*—Allan D. Herrmann

*Attorney, Agent, or Firm*—Young & Thompson

[57] ABSTRACT

A device for connecting either one of two alternative incoming Bowden cables with an outgoing Bowden cable has a frame with a cam plate. Two mirror-image cam curves each has a valley surrounded by higher cam portions. The incoming cables are connected to opposite ends of a link arm, the ends of which are also provided with cam engaging rollers. The center of the link arm is via an intermediate link connected to a swing arm, the free end of which is connected to the outgoing cable. In neutral position, the link arm extends between the cam valleys. When one of the incoming cables is operated, the associated cam engaging roller will climb out of its valley, thereby pushing the link arm towards the opposite cam curve so that the opposite cam engaging means engages its cam valley to form a pivot axis for the link arm. The intermediate arm transfers the pivoting movement to the swing arm and outgoing cable.

10 Claims, 5 Drawing Figures

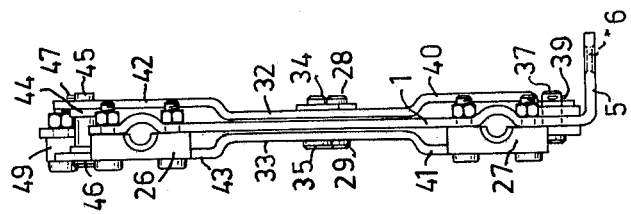
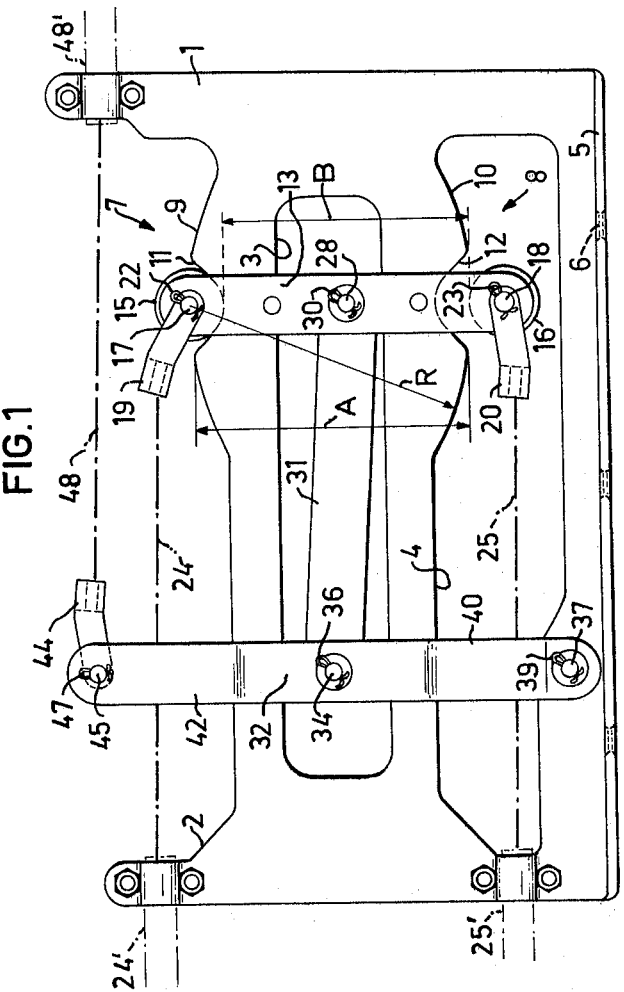

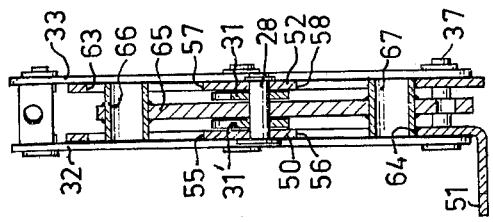
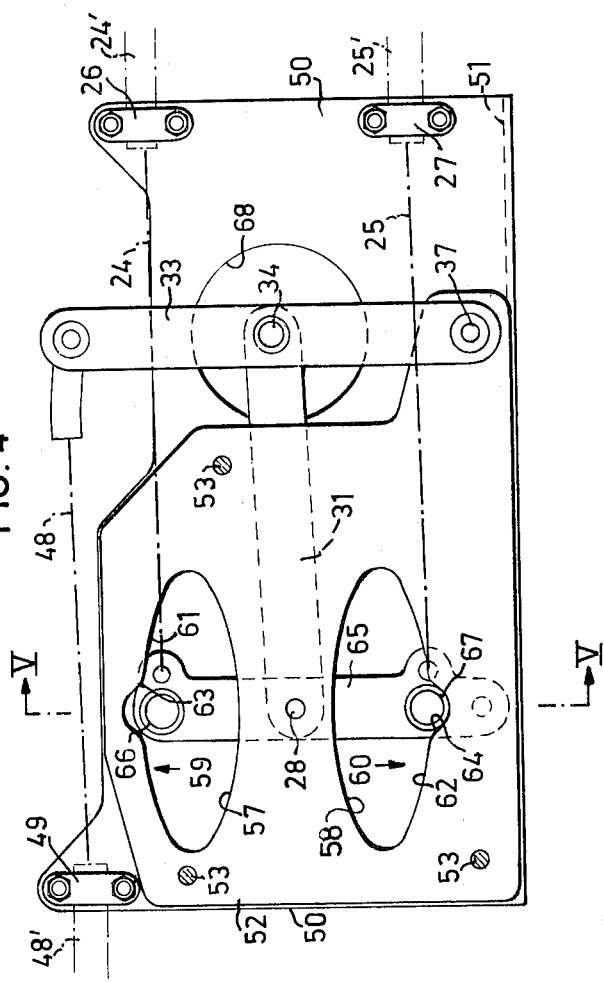

DEVICE FOR CONNECTING EITHER ONE OF TWO ALTERNATIVE OPERATING MEMBERS WITH AN OPERATED MEMBER

The present invention relates to a device for connecting either one of two alternative operating means, each of which comprises an elongated incoming operating member with axial operating movement, to a means intended for operation which likewise has an elongated axially movable outgoing operating member, especially to couple either one of two gear shift control cables to an operating cable leading to the gear shift mechanism of a boat motor.

Certain motor boats are provided with two steering locations, and steering as well as control of the motor should be possible as desired from either location. Direct coupling between the two operating levers for the gear shift mechanism of a boat motor is not desirable, inter alia because when operating from one steering location, the other operating lever and its transmission mechanism must also be brought into motion, and additional frictional forces overcome, and this makes the operation difficult and inexact. The purpose of the invention is thus primarily to develop a change-over coupling device for motor boats with double steering locations, with the help of which device either one of two operating means is connected to the gear shift mechanism of the motor, while the remaining operating means is taken out of operation. The operating means usually comprise operating levers which are coupled to control wires or Bowden cables. Thus the invention is primarily directed to a device for selective connection of either one of two similar cables with a third cable which leads to the gear shift mechanism. Alternatively, however, other transmission systems are conceivable, for example link mechanisms.

The problem is solved according to the invention in that the device comprises a frame; that the incoming operating members are connected to individual end portions of a link arm which is pivotably and displaceably guided in its plane in the frame; that the outgoing operating member is directly or indirectly pivotably connected to the central portion of the link arm; that both end portions of the link arm have cam engaging means disposed to cooperate with individual cams in the frame, wherein said cams extend essentially transverse to the longitudinal direction of the link arm and are shaped as mirror images of one another and each has a valley surrounded by higher cam curve portions; and that the distance between the cam engaging means of the link arm is so chosen in relation to the distance between the valleys of the cam curves and to their depth that either one, but not both, of the end portions of the link arm with associated cam engaging means can be swung out of the associated cam valley, while the cam engaging means at the opposite end of the link arm engages the associated cam valley and forms the pivoting center of the link arm.

In a preferred embodiment of the device according to the invention the cam curve valleys are oriented with their bottoms pointing towards one another and are siutated in cam ridges pointing away from one another, and the portions of the link arm's cam engaging means cooperating with the cams face one another.

According to an alternative embodiment of the invention the cam curve valleys have their bottoms pointed away from one another and are siutated in cam curve depressions which point away from one another, the portions of the link arm's cam engaging means cooperating with the cams facing away from one another.

The cams are preferably made in a cam plate in the frame which is parallel to the link arm. This simplifies the manufacture of cams and frame. According to a preferred embodiment the cams are formed of edge surfaces of openings in the plate and the cam engaging means are rollers pivotably connected to the link arm. Alternatively, the cams can be disposed as non-penetrating grooves in the plate. Cam engaging means in the form of slide surfaces, e.g. on feeler pins running in the cam grooves, can be used as alternatives to rotating rollers.

According to a preferred embodiment of the device the link arm is pivotably connected at its center portion to one end of an intermediate arm, the other end of which intermediate arm is pivotably connected to the center portion of a swing arm. One end portion of the swing arm is pivotably connected to the frame while the outgoing operating member is connected to the opposite end portion of the swing arm. With this arrangement that loss of movement which occurs in the operating movement in the first link arm, acting as a single-armed lever, is counteracted by the swing arm connected to the outgoing operating member, which likewise acts as a single-armed lever. Thus the operating movement of the outgoing operating cable can be made as great for the ingoing operating cables.

A simple, inexpensive and a productively advantageous device according to the invention is characterized in that the frame is formed of a single cam plate; that one link arm is disposed on each side of the plate; that the cam engaging means are disposed between the adjacent ends of the link arms; and that the plate is provided with attachment or guide means for the incoming and outgoing operating members. Thus the whole coupling device according to the invention is completely formed of the single cam plate, which is suitably provided with attachment holes or other attachment means for attachment to the motor boat. If the device is to be mounted in the open it can be provided with a case, which can be constructed independently of the function of the device.

Alternatively, the device can be so constructed that the frame comprises two parallelly arranged cam plates with identical cam curves running in parallel, the link arm being located between the plates and having cam engaging means arranged on both sides to engage the cam curves of the adjacent plate. This device has fewer moving parts and can be made more rigid.

Two embodiments of the invention are described below with reference to the accompanying drawings, in which FIGS. 1, 2 and 3 show the coupling device according to a first example of the invention from the side, above, and one end respectively; and FIGS. 4 and 5 show a second embodiment of the invention viewed from the side and in section along the line V—V in FIG. 4, respectively.

The device shown in FIGS. 1-3 comprises a frame in the shape of an essentially rectangular plate 1, which from its upper long side in FIG. 1 has a cut-out 2. Further, the plate has a central rectangular opening 3 and a substantially rectangular opening 4 along its lower long side, which also has a perpendicularly bent-out bottom part 5, which forms the base of the frame and is provided with holes 6 for attachment screws.

The right-hand portions, in the drawing, of the adjacent edges of the cut-out 2 and the opening 4 are shaped as cam curves 7, 8 respectively. The cam curves 7, 8 are shaped as mirror images of one another and each is formed as a ridge 9, 10, the top of which has a valley 11 and 12, respectively. Two link arms 13, 14 are disposed parallel with one another on either side of the cam plate 1. Between each pair of adjacent ends of the link arms 13, 14 there is a wheel 15 and 16, respectively, journalled on an axle 17 and 18, respectively, which extends through appropriate holes in the ends of the link arms 13, 14. A fork-shaped wire attachment means 19 and 20, respectively, is also pivotably journalled on the axle 17 and 18, respectively, by the axle extending through holes (not shown) in the legs of the wire attachment means, which extend beside the outwardly facing side surfaces of the link arms 13, 14. One end of the axles 17, 18 has a head 21 of larger diameter. Through the opposite end of the axle 17, 18 a cotter pin, 22 and 23 respectively, extends on the outward facing side of the leg of the respective wire attachment means. The wire attachment means 19, 20 are rigidly joined to the ends of individual cable cores 24 and 25 respectively (shown only schematically), which extend essentially parallel to the long sides of the cam plate 1 towards its left-hand short side in FIG. 1. There, the sheaths 24', 25' (likewise only schematically shown) of the cable cores 24, 25 are attached to the cam plate 1 with the aid of clamps 26 and 27 respectively.

An axle 28 extends between the axles 17 and 18, parallel to the same, through link arms 13, 14. The axle 28, as are axles 17 and 18, is provided with a head 29 and cotter pin 30. On the axle 28 between the link arms 13 and 14, one end of an intermediate arm 31 is journalled, said intermediate arm 31 lying in the plane of the cam plate 1 and being movable in its opening 3. The opposite end of the intermediate arm 31 extends between two swing arms 32, 33 disposed parallel the cam plate 1 and is pivotably journalled on an axle 34 extending through a central hole (not shown) in the swing arms 32, 33. This axle, as are the axles of the link arms 13, 14, is provided with a head 35 and cotter pin 36.

The swing arms 32, 33, at their lower ends, are pivotably journalled on an axle 37, which extends through the cam plate and is held in place axially by means of a head 38 and cotter pin 39 on both outwardly facing sides of the swing arms 32, 33. The swing arms 32, 33 are provided, between the axles 34 and 37, with portions 40 and 41 respectively, bent out from one another, forming an intermediate space, through which the cable core 25 can run freely. The upper ends of the swing arms 32, 33 are also bent out to form end portions 42 and 43, extending parallel at a greater distance from one another, and which grip the outsides of the legs of a wire attachment member 44 of the same construction as the wire attachment members 19, 20. The wire attachment member 44 is pivotably connected to the swing arms 32, 33 with the aid of a transverse axle 45 which, as are the other axles, is axially held in place with the aid of a head 46 and cotter pin 47. The wire attachment member 44 is rigidly joined to the end of a cable core 48 (shown only schematically), whose cable sheath 48' (also shown only schematically) is held fast to the cam plate 1 with the aid of a clamp 49 screwed to the same.

Cables 24, 25 are the incoming operating cables and are connected to individual alternative gear shift controls in a motor boat. The operating cable 48 forms the outgoing cable, which is connected to the gear shift mechanism of the boat motor. The drawing shows the device in the state where both of the gear shift controls are in the neutral position. Under the effect of gravity the link arms 13 and 14 and the parts connected thereto have dropped down until the upper wheel 15 rests against the bottom of cam curve valley 11. In this position the lower cam ridge 10 forms an arc of a circle having the axle 17 as center. Since the cam curves 7, 8 are mirror images of one another, conversely, the cam curve ridge 9 is an arc of a circle with its center in the center of the axle 18 when the wheel 16 rests against the bottom of cam valley 12. The radius of the arcs 9, 10 is designated by R in FIG. 1. This radius R is to be less than the distance between the center line of the axle 17 (18) and the nearest part of the wheel 16 (15) on the opposing end of the link arm, so that said wheel can swing over the cam ridge 10 (9). At the same time the greatest distance A between facing parts of the cam shall be greater than the distance B between the most closely lying parts of the wheels 15, 16. This prevents both wheels from leaving their cam valleys 11, 12 at the same time.

If the device is in the neutral position shown in FIG. 1 and cable core 25 is pulled out from the device to the left in FIG. 1, the lower ends of the link arms 13, 14 with the wheel 16 will pivot clockwise around the axle 17, and the wheel 16 will run over the left-hand portion of the cam ridge 10. This also displaces the intermediate arm 31 to the left in the opening 3 which will in turn pivot the swing arms 32, 33 counter-clockwise around the axle 37. This also gives the cable core 48 an operating movement directed to the left, which acts on the gear shift mechanism of the motor, for example for engaging the forward gear. The link arms 13, 14 and the swing arms 32, 33 act as single-armed levers which are connected by the intermediate arm 31. Thus the operating movement of the incoming cable is transferred to the outgoing cable while maintaining the direction. The ratio between the sizes of the operating movements can be chosen by the selection of lever lengths for the link arms 13, 14 and the swing arms 32, 33.

If the operating movement on the cable core 25 is directed in the opposite direction, to the right in FIG. 1, the link arms 13, 14 are displaced counter-clockwise around the axle 17 so that the wheel 16 runs over the right-hand cam ridge 10. This movement is transferred via the intermediate arm 31 to the swing arms 32, 33 so that the cable core 48 is also displaced to the right, thereby engaging the reverse gear.

If the operating movement is made on cable core 24, the wheel 15 will roll from the position shown in FIG. 1 up one or the other side of the cam valley 11 depending on the direction of the operating movement. This pulls the link arms 13, 14 upwards until the lower wheel 16 engages against the bottom of cam valley 12. As the operating movement continues, the wheel 15 is moved out over one part or the other of the cam ridge 9, thereby pivoting the link arms 13, 14. This movement is transferred in the manner described above by the intermediate arm 31 and the swing arms 32, 33 to the outgoing operating cable 48. In this case also the operating movement in this cable will be in the same direction as the incoming operating movement, due to the fact that the center of rotation for the link arms 13, 14 has been shifted from the upper to the lower end of the link arms.

FIGS. 4 and 5 show a second embodiment of the invention. Parts which directly correspond to FIGS. 1-3 have retained the same reference numerals here.

The change-over coupling device according to FIGS. 4, 5 differs from that according to FIGS. 1–3 primarily in that it is constructed of two parallelly arranged cam plates and in that the cam curves face away from one another. A first cam plate 50 has a foot 51 bent out at right angles for attaching the coupling device in a boat, for example. A second cam plate 52, arranged parallel to cam plate 50, is attached to plate 50 at a distance from the same with the aid of spacing means (not shown) and posts 53 as well as axle 37. The cam plates 50, 52 are each provided with two openings 55, 56 and 57, 58 respectively. The openings in the two plates are identical with one another and are aligned with one another. Furthermore, the upper openings 55, 57 are shaped as mirror images of the lower openings 56, 58. The edges of the upper and lower openings facing away from one another are shaped as cam curves 59 and 60. Each cam curve is shaped as a comparatively shallow depression 61, 62 in the middle of which there is a definite cam valley 63, 64.

A link arm 65 is disposed between the cam plates 50, 52 at the openings 55–58. A penetrating tube 66 and 67 respectively is attached to both ends of the link arm 65, which tube extends in both directions from the link arm 65 through the openings 55, 57 and 56, 58, respectively, of the cam plates 50, 52. In the neutral position shown in the drawing the lower tube 67 rests in the lower cam valleys 64.

In its middle the link arm 65 is pivotably connected via the axle 28 to two parallelly disposed intermediate arms 31, 31', the other ends of which are in turn pivotably connected via the axle 34 to the center point of two swing arms 32, 33 parallelly disposed to one another. The swing arms 32, 33 are pivotable around the axle 37 and are located next to the outwardly facing side surfaces of the cam plates 50, 52. The axle 34 extends through an opening 68 in the cam plate 50. The right hand portion of the cam plate 52 is cut away to allow free movement of the axle 34.

The two incoming operating cables 24, 24' and 25, 25' are connected (not shown in more detail here) with individual ends of the link arm 65 while the outgoing operating cable 48, 48' is connected to the upper end of the swing arms 32, 33.

In this case also, the cams and the cam engaging means, in this case in the form of tubes, are dimensioned so that when a tube rests in the associated cam valley the opposite tube can be freely displaced out of its associated cam valleys, while simultaneous displacement of both tubes from associated cam valleys is prevented. In the neutral position of the device as shown in the drawing the tube 67 rests in the cam valleys 64, so that the tube 66 via an operating movement of the cable 24 can be freely swung out over the associated cam valleys 61. Link arm 65 is then pivoted and its movement is transferred in the manner described above to the swing arms 32, 33 and the outgoing cable 48. If the operating movement is instead imparted to the cable 25 the tube 67 will slide up the sides of the associated cam valleys 64, displacing the link arm 65 upwards until the upper tube 66 engages the bottoms of cam valleys 63. Continued operating movement of the cable 25 causes the link arm 65 to rotate so that the tube 67 slides over the right-hand or left-hand cam depressions 62. In this case also the operating movement of the operating cable 25 is transferred to the outgoing cable 48 while maintaining the direction.

As in the embodiment according to FIGS. 1–3 the cams are shaped as arcs of a circle, the center points of which coincide with the axis of the cam engaging means resting in the opposite cam valley. This prevents the cam engaging means (wheel or tube) forming the center of rotation from falling out of the associated cam valley. The better the fitting is of these parts, the less play there will be in the transference of the operating movement.

In both of the embodiments the cable arrangement has been shown so that the two incoming cables enter one short side of the device while the outgoing cable is connected to the opposite short side of the device. Depending on how the change-over coupling device is to be installed, the incoming and outgoing cables can, however, be connected on the same short side of the frame, whereby the incoming and outgoing operating movements will have opposite directions; or the incoming operating cables can be connected to individual short sides of the frame in which case the operating means of the incoming cable located on the same side as the outgoing cable should have reversed working direction, for example in the form of a gear shift control with inverted inner functioning.

The change-over coupling device is suitably placed relatively close to the motor so that the cable to the motor is shorter than the cables to the operating levers. In this way there is greater frictional resistance to the movement of the incoming cables than to the outgoing, thereby guaranteeing that the outgoing cable actually performs the desired operating movement and prevents the arm 13 or 65 from merely pivoting around the axle 28 and possibly jamming without affecting the outgoing cable.

What I claim is:

1. A device for connecting either one of two alternative operating means, each of which comprises an elongated incoming operating member (24, 25) with axial operating movement, to a means intended for operation, which likewise has an elongated axially movable outgoing operating member (48), especially to couple either one of two gear shift control cables (24, 25) to an operating cable (48) leading to the gear shift mechanism of a boat motor, characterized in that the device comprises a frame (1,50;52); that the incoming operating members (24, 25) are connected to individual end portions of a link arm (13,14;65) which is pivotably and displaceably guided in its plane in the frame; that the outgoing operating member (48) is directly or indirectly pivotably connected to the central portion of the link arm; that both end portions of the link arm (13,14;65) have cam engaging means (15,16;66,67) disposed to cooperate with individual cams (7,8;59,60) in the frame, which cams extend essentially transverse to the longitudinal direction of the link arm and are shaped as mirror images of one another and each has a valley (11,12;63,64) surrounded by higher cam curve portions (9,10;61,62); and that the distance (B) between the cam engaging means (15,16;66,67) of the link arm (13,14;65) is so chosen in relation to the distance between the valleys of the cam curves and to their depth that either one, but not both, of the end portions of the link arm with associated cam engaging means (15,16;66,67) can be swung out of the associated cam valley (11,12;63,64) while the cam engaging means (16,15;67,66) at the opposite end of the link arm engages the associated cam valley (12,11;64,63) and forms the pivoting center of the link arm.

2. Device according to claim 1, characterized in that the cam valleys (11,12) have their bottoms pointing towards one another and are situated in cam ridges (9,10) pointing away from one another; and that the portions of the link arm's (13,14) cam engaging means (15,16), which interact with the cams, face one another (FIGS. 1-3).

3. Device according to claim 1, characterized in that the bottoms of the cam valleys (63,64) face away from one another and said cam valleys are situated in cam depressions (61,62) facing away from one another; and that the portions of the link arm's (65) cam engaging means (66,67) which interact with the cams, face away from one another (FIGS. 4,5).

4. Device according to claim 1, characterized in that the cams are made in a cam plate (1;50,52) which forms part of the frame and is parallel to the link arm (13,14;65).

5. Device according to claim 4, characterized in that the cams (7,8;59,60) are formed of edge surfaces of openings (2,4;55-58) in the plate (1;50,52); and that the cam engaging means are wheels (15,16) pivotably connected to the link arm.

6. Device according to claim 1, characterized in that the link arm (13,14;65) is pivotably connected (28) at its central portion with one end of an intermediate arm (31;31,31'), the end of which is pivotably connected (34) to the central portion of a swing arm (32,33); that one end portion of the swing arm is pivotably connected (37) with the frame (1;50,52); and that the outgoing operating member (48) is connected to the opposite end portion (42,43;) of the swing arm (32,33).

7. Device according to claim 4, characterized in that the frame is formed of a single cam plate (1); that one link arm (13,14) is arranged on each side of the plate; that cam engaging means (15,16) are arranged between the adjacent ends of the link arms; and that the plate (1) is provided with attachment or guide means (26,27,49) for the incoming and outgoing operating members (24,25,48) (FIGS. 1-3).

8. Device according to claim 4, characterized in that the frame comprises two parallelly arranged cam plates (50,52) with identical cams (59,60) running in parallel; and that the link arm (65) is located between the plates (50,52) and has on each side cam engaging means (66,67) disposed to cooperate with the cams of the adjacent plate (FIGS. 4,5).

9. Device according to claim 1, characterized in that the cam curves (7,8;59,60) have the shape of arcs of a circle (9,10;61,62) whose center point coincides with the center line of the cam engaging means (16,15;67,66) forming the pivot axis at the opposite cam (10,9;62,61) when said cam engaging means rests in the associated cam valley (12,11;64,63).

10. Device according to claim 1, characterized in that the frame (1;50,52) is so located, preferably close to the motor, that the frictional resistance in the outgoing operating cable (48) is less than in the incoming operating cables (24,25).

* * * * *